United States Patent
Cohen et al.

(10) Patent No.: US 7,702,128 B2
(45) Date of Patent: Apr. 20, 2010

(54) SYSTEM AND METHOD FOR SCANNING A BUSINESS CARD FROM WITHIN A CONTACTS ADDRESS BOOK AND DIRECTLY INSERTING INTO THE ADDRESS BOOK DATABASE

(75) Inventors: Omer Cohen, London (GB); Iuval Hatzav, Los Angeles, CA (US)

(73) Assignee: CSSN Inc. Card Scanning Solutions

( * ) Notice: Subject to any disclaimer, the term of this patent is extended or adjusted under 35 U.S.C. 154(b) by 1017 days.

(21) Appl. No.: 11/307,943

(22) Filed: Feb. 28, 2006

(65) Prior Publication Data

US 2006/0221409 A1 Oct. 5, 2006

Related U.S. Application Data

(60) Provisional application No. 60/657,744, filed on Mar. 3, 2005.

(51) Int. Cl.
*G06K 9/00* (2006.01)
(52) U.S. Cl. .................................. 382/100; 382/317
(58) Field of Classification Search .................. 382/100, 382/317; 715/224, 226
See application file for complete search history.

(56) References Cited

U.S. PATENT DOCUMENTS

| | | | | |
|---|---|---|---|---|
| 5,499,108 | A | 3/1996 | Cotte et al. | 358/400 |
| 6,650,761 | B1* | 11/2003 | Rodriguez et al. | 382/100 |
| 7,103,198 | B2* | 9/2006 | Huang | 382/100 |
| 2002/0131636 | A1* | 9/2002 | Hou | 382/181 |
| 2006/0245003 | A1* | 11/2006 | Stumbo et al. | 358/402 |

OTHER PUBLICATIONS

Webb, "Scanning beats manual entry," Computing Canada, Nov. 12, 2004, vol. 30, No. 16, p. 26.*
"CardScan Executive: Import Business Card Info into Your Pocket PC," Smartphone & Pocket PC, Feb. 2005, vol. 8, No. 1.*

* cited by examiner

*Primary Examiner*—Andrew W Johns

(57) ABSTRACT

A system and method for scanning a business card or a driver's license from within MS Outlook directly into the address book of MS Outlook. The system includes a scanning device and a program application that is integrated with MS Outlook. The application controls the card scanner connected to the personal computer, stores the acquired image of the scanned card, extracts the text data and image data using an OCR module, opens a new contact in the MS Outlook address book and inserts the extracted textual and image data into said contact each in its appropriate field.

17 Claims, 4 Drawing Sheets

SYSTEM AND METHOD FOR SCANNING A BUSINESS CARD FROM WITHIN A CONTACTS ADDRESS BOOK AND DIRECTLY INSERTING INTO THE ADDRESS BOOK DATABASE

CROSS-REFERENCE TO RELATED APPLICATIONS

The present application claims the benefit under 35 U.S.C. 119(e) of U.S. provisional application 60/657,744 filed on Mar. 3, 2005, the disclosure of which is incorporated herein by reference.

FIELD OF THE INVENTION

The present invention relates to systems and methods for scanning business cards, especially to a system that can scan a business card from within MS Outlook®, extracts the text data and image data from the image generated and inserts the extracted data directly into the appropriate fields of a contact record in the MS Outlook® address book database.

BACKGROUND OF THE INVENTION

A business card scanner is a compact scanner for reading and organizing business cards. A business card is scanned into a graphic file by the business card scanner, and the graphic file of the business card is sent to a computer through a standard computer interface such as USB interface. The graphic file is then accessed by post-processing software such as optical character reorganization (OCR) software to convert it into text information. The text information may include Name, Title, Company, E-mail and Address field and can then be saved to an address file such as MS Outlook® address file.

In the known art, there is no known method that enables the scanning of a business card from within MS Outlook® directly into its own contact file. In today's art, a third party application is needed to import the scanned textual and image data into the MS Outlook® address file. CardScan™ from Corex is such a product in today's market which can scan a business card and update MS Outlook® address book, but it needs to be run separately and cannot be run from within MS Outlook®. Other such products are BizCardReader from CardReader Inc., SnapScan™ from FutureDial's, WorldCard from AsiaZest (Alestron Inc.) and IRIS Business Card Reader.

U.S. Pat. No. 5,499,108 given to Cotte et al. provides a document scanning system that is triggered by the inserted document which then lunches the software application. It is desirable to be able to auto sense the inserted document being controlled by the software application without having to lunch another application.

It is thus desirable to be able to scan a business card or a driver's license from within MS Outlook® and be able to automatically store the extracted data in the MS Outlook® address book, without having to open another application. This will release the user from the need to open a third party application that is dedicated to scanning the card, extracting the data and then it can also update the MS Outlook® address book.

SUMMARY OF THE INVENTION

It is an object of the present invention to provide a system that can, from within MS Outlook®, control the business card scanner connected to a personal computer on which the system is running, store the acquired image of the scanned business card in said computer, extract all text data and image data using an OCR module, open a new MS Outlook® contact record and insert the extracted text and image data into the appropriate fields of said contact record.

It is another object of the present invention to integrate said system into MS Outlook® such that it is operated from within MS Outlook®. The business card scanner can then be enabled, disabled and setup from within MS Outlook®.

It is yet another object of the present invention to read a driver's license and extract the data stored on it, similarly to a business card.

It is still another object of the present invention to distinguish between a business card and a driver's license or any other type of documents.

It is yet another object of the present invention to be able to sense when a card is inserted into the scanner using an auto paper sense which is controlled from within the software.

These and other advantages of the present invention will become apparent upon reading the following detailed descriptions and studying the various figures of the drawings.

BRIEF DESCRIPTION OF THE DRAWINGS

The present invention will be better understood by reference to the accompanying drawings, wherein.

DETAILED DESCRIPTION OF THE INVENTION

The present invention will become fully understood from the detailed description given herein below and the accompanying drawings, which are given by way of illustration only and thus not limitative of the present invention, and wherein.

A system and method for scanning a business card or a driver's license from within MS Outlook® directly into the address book of MS Outlook®. The system includes a scanning device and a program application that is integrated with MS Outlook®. The application controls the card scanner connected to the personal computer, stores the acquired image of the scanned card, extracts the text data and image data using an OCR module, opens a new contact in the MS Outlook® address book and inserts the extracted textual and image data into said contact each in the appropriate field.

Figure 1:
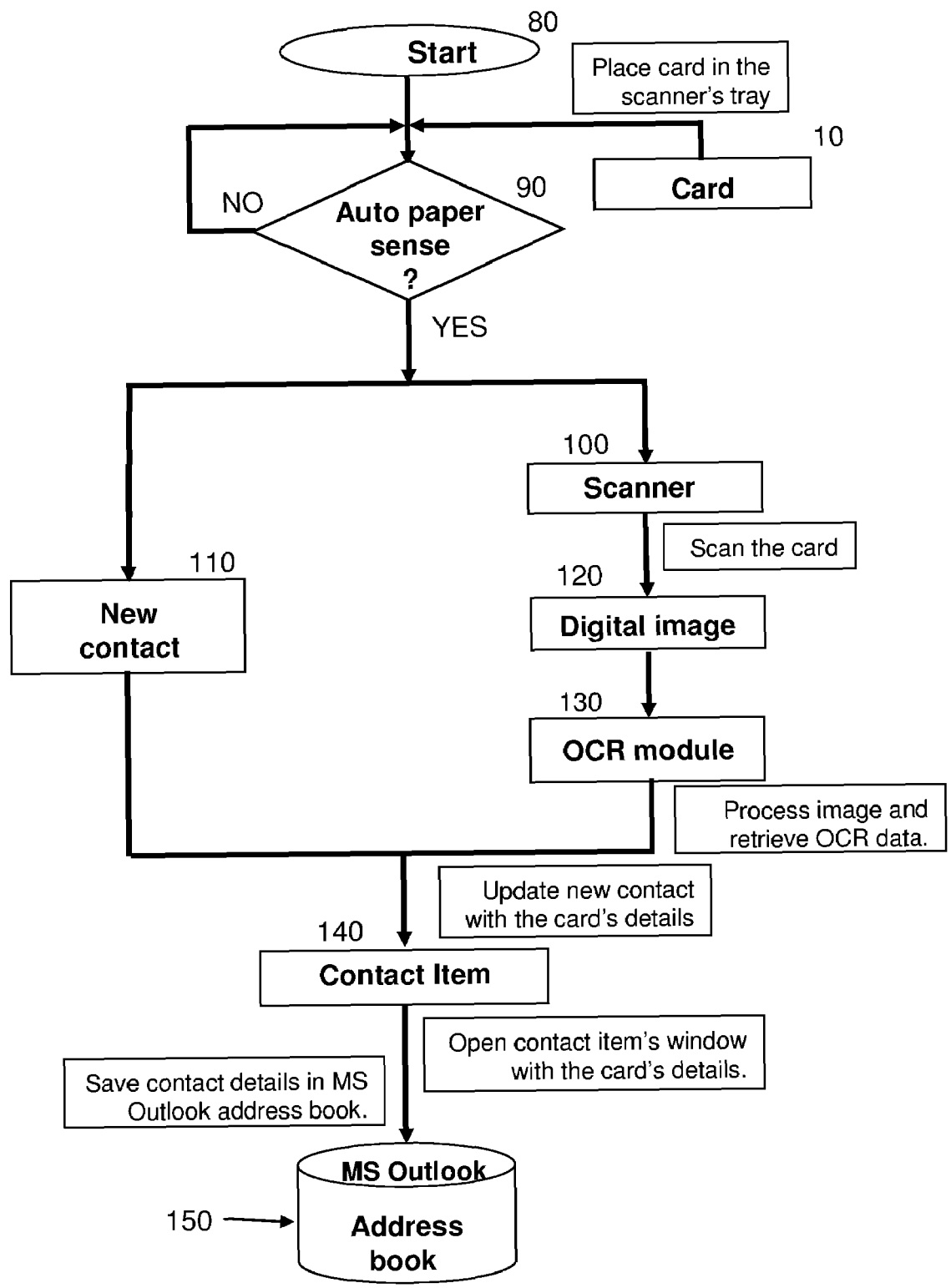
FIG. 1 is a schematic block diagram of the system of the present invention.
Figure 2:
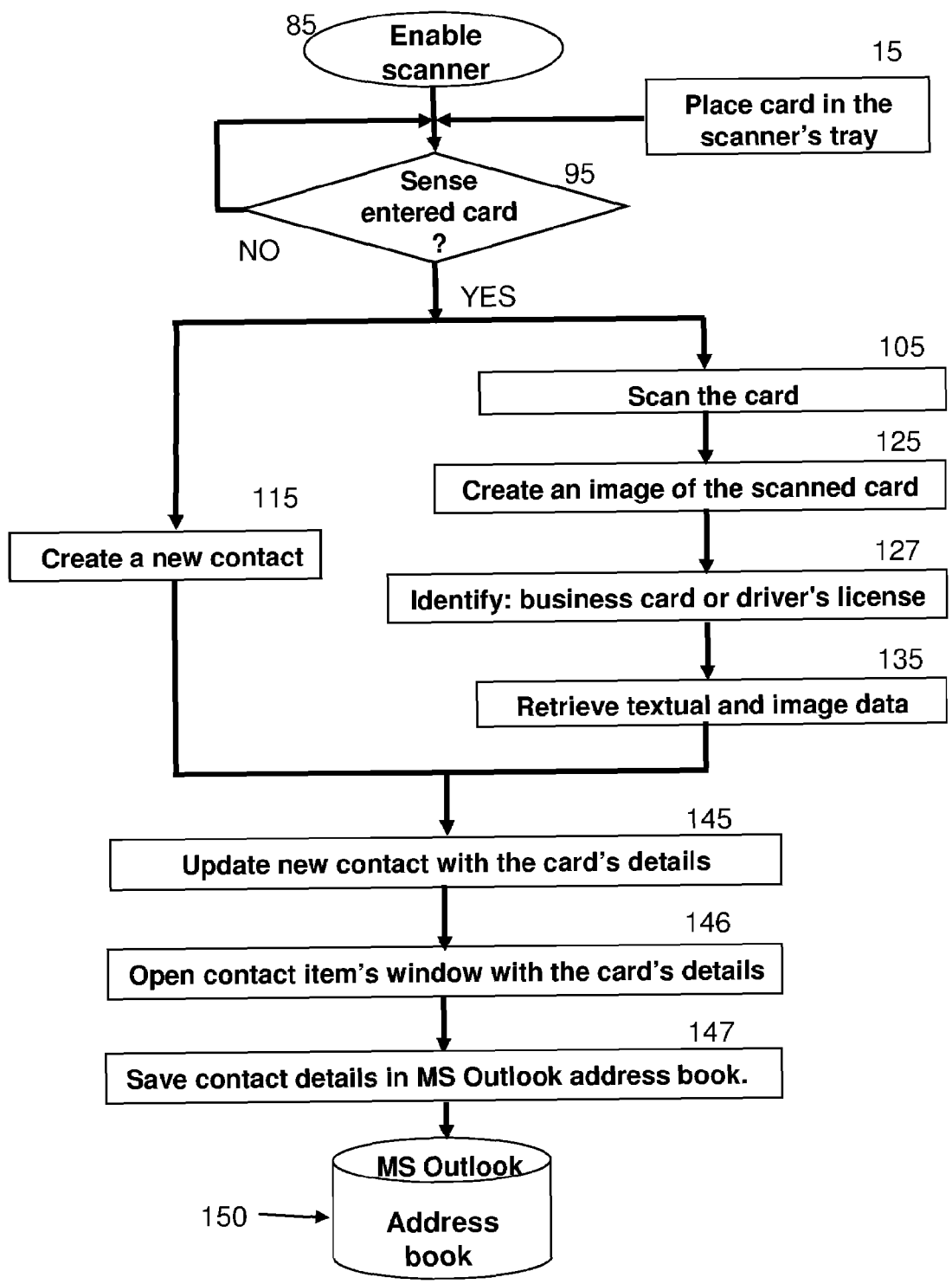
FIG. 2 is a schematic block diagram of the process data flow according to the application of the present invention.

FIG. 1 shows the schematic block diagram of the system of the present invention and FIG. 2 shows the schematic block diagram of the processes performed by the system of the present invention. The program application that realizes the system of the present invention is run from within MS Outlook® program application.

Referring to FIGS. 1 and 2, the system is activated from within MS Outlook® as starting point 80 by enabling 85 the scanner 100. The scanner 100 optionally comprises an auto paper sense 90 which senses 95 when a card 10 is introduced into the card feeder 102 (see FIG. 3). This auto sense mode is triggered by the host software realizing the system of the present invention When a business card 10 is inserted 15 into the card feeder 102 of the business card scanner 100, a new contact item 110 is created 115 in the MS Outlook® address file 150 and a digital image 120 is generated 125 and stored on the host computer 50. The image 120 is then processed by the OCR module 130 which identifies 127 symbols on the read card 10 that are typical to the different types of card, and then extracts 135 the textual data and image data. Contact data from the extracted data is then identified and inserted into the proper fields of the new contact just created 110 in the address file 150. Identified contact items 140 from said contact data are inserted 145, displayed 146 and saved 147, each in his appropriate field of the new contact 110 of the MS Outlook® address book 150.

Figure 3:
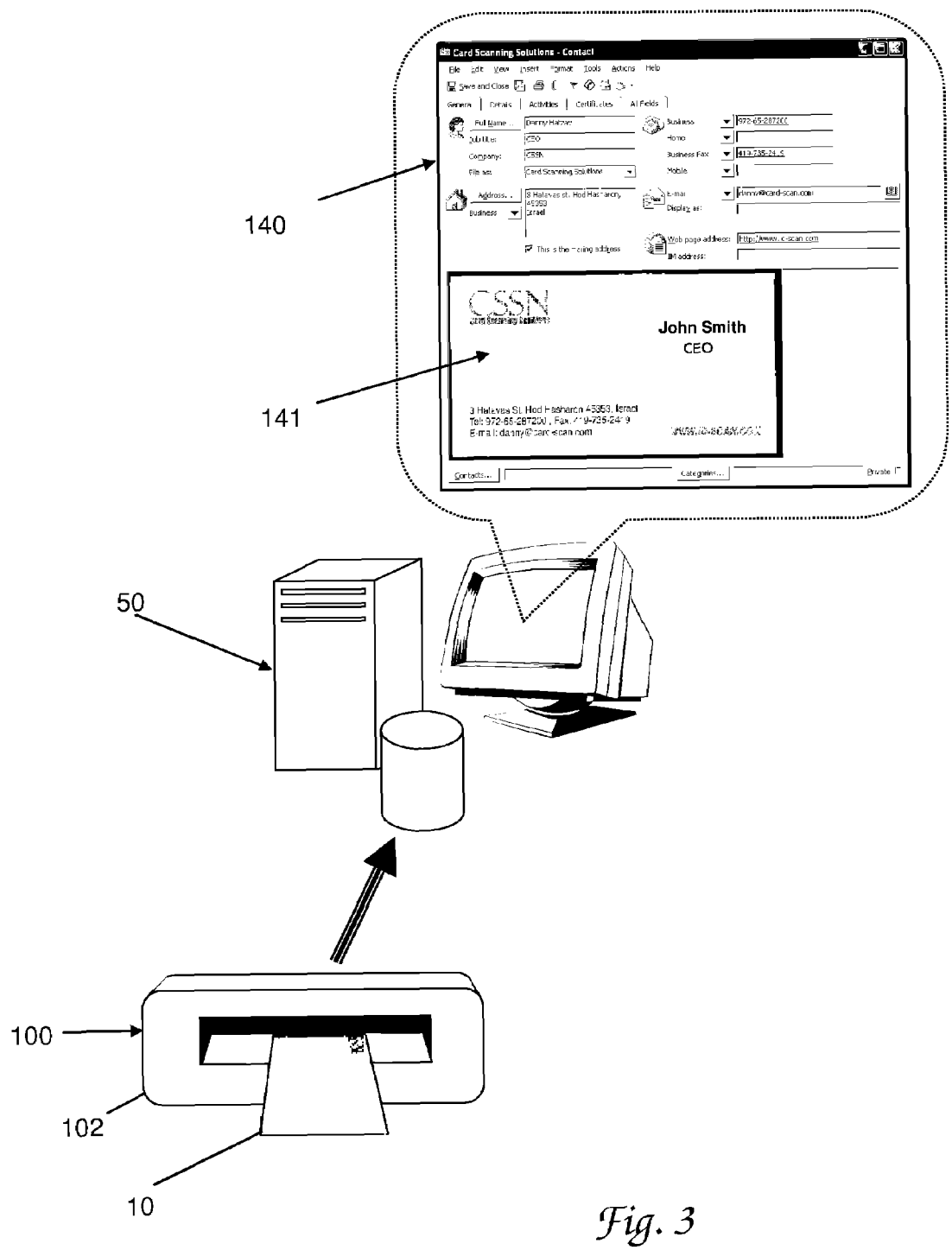
FIG. 3 depicts an example of the Input/Output of the system of the present invention.

In the example depicted in FIG. 3, a business card 10 is being read by a card scanner 100. The image generated is stored and processed by a personal computer 50. In this example, the process finalizes when an MS Outlook® contact window 140 pops up, showing the newly created contact with all the appropriate contact data inserted in corresponding fields, as read and processed by the system of the present invention. These fields include the name, title, address, company name, Email, phones, etc. Optionally the image of the card 141 can be displayed as well upon the MS Outlook® contact window 140.

Figure 4:
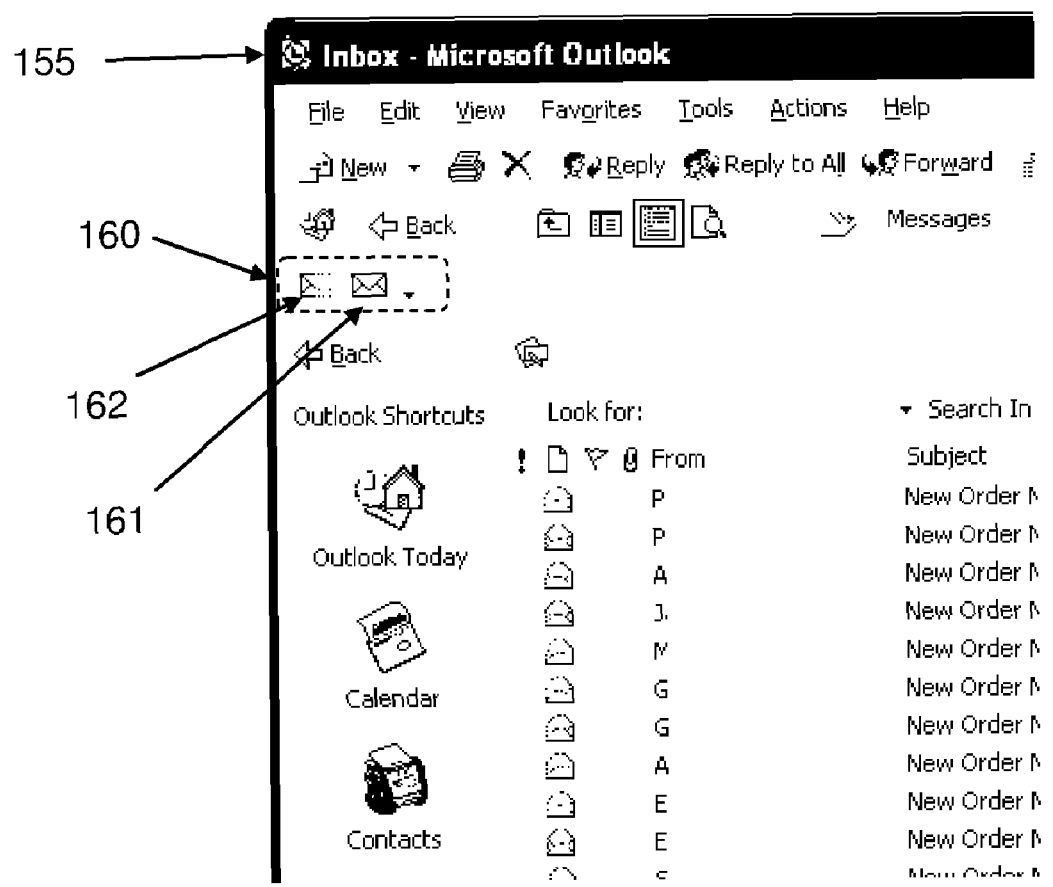
FIG. 4 depicts an example showing the icons controlling the card scanner.

When first installed, the program application is integrated with the MS Outlook® application and, as exemplified in FIG. 4, a special icon 161 is shown in a toolbar 160 of the Outlook® window 155. The icon 161 is used to enable or disable the card scanner. Instead of an icon, also a button can be used or in any other means a like. Another option is for another icon 162 designated to the setup and calibrate card scanner 100.

To sum up, the business card scanner according to the present invention provides a system that can, from within MS Outlook®, control the business card scanner 100 connected to a personal computer 50 on which the system is running, store the acquired image 120 of the scanned business card 10 in said computer, extract all textual data and image data using an OCR module 130, activate the MS Outlook® address file 150 and insert the extracted text and image data items 140 into the appropriate fields of said address file 150.

FIG. 1 shows the schematic block diagram of the system of the present invention and FIG. 2 shows the schematic block diagram of the processes performed by the system of the present invention. The program application that realizes the system of the present invention is run from within MS Outlook program application.

Referring to FIGS. 1 and 2, the system is activated from within MS Outlook as starting point 80 by enabling 85 the scanner 100. The scanner 100 optionally comprises an auto paper sense 90 which senses 95 when a card 10 is introduced into the card feeder 102 (see FIG. 3). This auto sense mode is triggered by the host software realizing the system of the present invention.

When a business card 10 is inserted 15 into the card feeder 102 of the business card scanner 100, a new contact item 110 is created 115 in the MS Outlook address file 150 and a digital image 120 is generated 125 and stored on the host computer 50. The image 120 is then processed by the OCR module 130 which identifies 127 symbols on the read card 10 that are typical to the different types of card, and then extracts 135 the textual data and image data. Contact data from the extracted data is then identified and inserted into the proper fields of the new contact just created 110 in the address file 150. Identified contact items 140 from said contact data are inserted 145, displayed 146 and saved 147, each in his appropriate field of the new contact 110 of the MS Outlook address book 150.

In the example depicted in FIG. 3, a business card 10 is being read by a card scanner 100. The image generated is stored and processed by a personal computer 50. In this example, the process finalizes when an MS Outlook contact window 140 pops up, showing the newly created contact with all the appropriate contact data inserted in corresponding fields, as read and processed by the system of the present invention. These fields include the name, title, address, company name, Email, phones, etc. Optionally the image of the card 141 can be displayed as well upon the MS Outlook contact window 140.

When first installed, the program application is integrated with the MS Outlook application and, as exemplified in FIG. 4, a special icon 161 is shown in a toolbar 160 of the Outlook window 155. The icon 161 is used to enable or disable the card scanner. Instead of an icon, also a button can be used or in any other means a like. Another option is for another icon 162 designated to the setup and calibrate card scanner 100.

To sum up, the business card scanner according to the present invention provides a system that can, from within MS Outlook, control the business card scanner 100 connected to a personal computer 50 on which the system is running, store the acquired image 120 of the scanned business card 10 in said computer, extract all textual data and image data using an OCR module 130, activate the MS Outlook address file 150 and insert the extracted text and image data items 140 into the appropriate fields of said address file 150.

Although the present invention has been described with reference to the preferred embodiment and examples thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the following claims.

What is claimed is:

1. A system for scanning a data card from within MS Outlook® directly into MS Outlook® address book database, comprising:
   a) a data card scanner;
   b) an application program module running on a computer system, wherein said application program module is integrated into MS Outlook®;
   c) an OCR module; and
   d) MS Outlook® address book database,
   wherein activation of MS Outlook® operatively activates said application program module;
   wherein said application program module operatively activates said data card scanner to scan a business card disposed at said data card scanner, and thereby creating a card image of said business card;
   wherein said application program module operatively identifies image data and textual data in said card image;
   wherein said application program module operatively activates said OCR module to extract textual data from said card image;
   wherein said application program module identifies textual data items in said textual data; and
   wherein said application program module manipulates said textual data items to create or update a contact record in said MS Outlook® address book database.

2. The system as in claim 1, wherein said card scanner comprises an auto paper sense controlled by said application program module.

3. The system as in claim 1, wherein the data card is a business card.

4. The system as in claim 1, wherein the data card is a driver's license.

5. The system as in claim 1, wherein said card scanner is enabled or disabled by feature in a MS outlook® window.

6. The system as in claim 5, wherein said feature is selected from the group consisting of: an icon in a toolbar, a button and a menu item.

7. The system as in claim 1, wherein said MS Outlook® contact record is a newly created contact record.

8. The system as in claim 1, wherein said MS Outlook® contact record is an existing contact record.

9. A method for scanning a data card from within MS Outlook® directly into MS Outlook® address book database, comprising the steps of:
   a) activating MS Outlook®;
   b) reading a data card by a designated scanner from within MS Outlook®, thereby creating a card image;
   c) identifying image data and textual data in said card image;
   d) extracting textual data and image data from said card image;
   e) identifying textual data items in said textual data by an OCR module; and
   f) inserting said extracted textual data items each in an appropriate field of a MS Outlook® contact record.

10. The method as in claim 9, wherein said designated scanner can sense when a card is inserted into said designated scanner using an auto paper sense.

11. The method as in claim 9, wherein the data card is a business card.

12. The method as in claim 9, wherein the data card is a driver's license.

13. The method as in claim 9, wherein said OCR module can distinguishes between a business card and a driver's license or substantially any other type of documents.

14. The method as in claim 9, wherein said designated scanner is enabled or disabled by a feature in MS outlook® window.

15. The method as in claim 14, wherein said feature is selected from the group consisting of: an icon in a toolbar, a button and a menu item.

16. The method as in claim 9, wherein said MS Outlook® contact record is a newly created contact record.

17. The method as in claim 9, wherein said MS Outlook® contact record is an existing contact record.

* * * * *